US011695519B2

(12) United States Patent
Park et al.

(10) Patent No.: US 11,695,519 B2
(45) Date of Patent: Jul. 4, 2023

(54) MULTI-BEAM PIGGYBACK DOWNLINK CONTROL INFORMATION

(71) Applicant: QUALCOMM Incorporated, San Diego, CA (US)

(72) Inventors: Sungwoo Park, Seoul (KR); Wooseok Nam, San Diego, CA (US); Tao Luo, San Diego, CA (US); Kiran Venugopal, Raritan, NJ (US); Tianyang Bai, Somerville, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 46 days.

(21) Appl. No.: 17/233,264

(22) Filed: Apr. 16, 2021

(65) Prior Publication Data

US 2021/0328731 A1    Oct. 21, 2021

Related U.S. Application Data

(60) Provisional application No. 63/013,390, filed on Apr. 21, 2020.

(51) Int. Cl.
*H04W 72/04* (2023.01)
*H04W 72/12* (2023.01)
*H04W 72/14* (2009.01)
*H04L 1/22* (2006.01)
*H04W 72/044* (2023.01)
*H04L 1/08* (2006.01)
*H04W 72/23* (2023.01)
*H04L 5/00* (2006.01)

(52) U.S. Cl.
CPC .............. *H04L 1/22* (2013.01); *H04L 1/08* (2013.01); *H04W 72/044* (2013.01); *H04W 72/23* (2023.01); *H04L 5/0044* (2013.01); *H04L 5/0091* (2013.01)

(58) Field of Classification Search
CPC . H04L 1/08; H04L 1/22; H04L 5/0044; H04L 5/0091; H04W 72/044; H04W 72/1289
See application file for complete search history.

(56) References Cited

U.S. PATENT DOCUMENTS

| 2018/0124753 | A1* | 5/2018 | Sun | H04W 72/042 |
| 2020/0084793 | A1* | 3/2020 | Bai | H04W 72/1289 |
| 2020/0100219 | A1* | 3/2020 | Takeda | H04L 1/189 |
| 2020/0359407 | A1* | 11/2020 | Takeda | H04L 5/0094 |

OTHER PUBLICATIONS

International Search Report and Written Opinion—PCT/US2021/070416—ISA/EPO—dated Jul. 19, 2021.
(Continued)

*Primary Examiner* — Brian P Cox
(74) *Attorney, Agent, or Firm* — Harrity & Harrity, LLP

(57) ABSTRACT

Various aspects of the present disclosure generally relate to wireless communication. In some aspects, a user equipment may receive, on a downlink control channel and a first beam, first downlink control information (DCI), wherein the first DCI identifies a second DCI that is carried on a downlink shared channel; and receive multiple repetitions of the second DCI on the downlink shared channel on a plurality of second beams.

30 Claims, 8 Drawing Sheets

(56) References Cited

OTHER PUBLICATIONS

Qualcomm: "E-mail Discussions on 2-Stage DCI for NR", 3GPP Draft, TSG-RAN WG1 #88, R1-1702629 E-mail Discussions on 2-Stage DCI for NR, 3rd Generation Partnership Project (3GPP), Mobile Competence Centre, 650, Route Des Lucioles, F-06921, Sophia-Antipolis Cedex, France, vol. RAN WG1. No. Athens, Greece, Feb. 13, 2017-Feb. 17, 2017, Feb. 15, 2017, (Feb. 15, 2017), XP051222023, 12 pages, Retrieved from the Internet: URL: http://www.3gpp.org/ftp/tsg_ran/WG1_RL1/TSGR1_88/Docs/ [retrieved on Feb. 15, 2017], Sections 1, 3, 4, Sections 2 and 4.1, section 3, paragraph [04.1].

ZTE, et al., "PDCCH Procedure and DCI Carried by PDSCH Region", 3GPP Draft, 3GPP TSG RAN WG1 Meeting #88, R1-1701588, 3rd Generation Partnership Project (3GPP), Mobile Competence Centre; 650, Route Des Lucioles; F-06921 Sophia-Antipolis Cedex; France, Athens, Greece, Feb. 13, 2017-Feb. 17, 2017, pp. 1-4, Feb. 7, 2017 (Feb. 7, 2017), XP051220807, Retrieved from the Internet: URL: http://www.3gpp.org/ftp/tsg_ran/WG1_RL1/TSGR1_88/Docs/ [retrieved on Feb. 7, 2017] paragraph [002.], figures 1.2.

\* cited by examiner

MULTI-BEAM PIGGYBACK DOWNLINK CONTROL INFORMATION

CROSS-REFERENCE TO RELATED APPLICATION

This patent application claims priority to U.S. Provisional Patent Application No. 63/013,390, filed on Apr. 21, 2020, entitled "MULTI-BEAM PIGGYBACK DOWNLINK CONTROL INFORMATION," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for multi-beam piggyback downlink control information (DCI).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment, may include receiving, on a downlink control channel and a first beam, first downlink control information (DCI), wherein the first DCI identifies a second DCI that is carried on a downlink shared channel; and receiving multiple repetitions of the second DCI on the downlink shared channel on a plurality of second beams.

In some aspects, a method of wireless communication, performed by a base station, may include transmitting, on a downlink control channel and a first beam, first DCI, wherein the first DCI includes scheduling information for a second DCI that is carried on a downlink shared channel; and transmitting multiple repetitions of the second DCI on the downlink shared channel on a plurality of second beams.

In some aspects, a user equipment for wireless communication may include memory; one or more processors operatively coupled to the memory; and instructions stored in the memory. The instructions in the memory may be operable, when executed by the one or more processors, to cause the user equipment to receive, on a downlink control channel and a first beam, first DCI, wherein the first DCI identifies a second DCI that is carried on a downlink shared channel; and receive multiple repetitions of the second DCI on the downlink shared channel on a plurality of second beams.

In some aspects, a base station for wireless communication may include memory; one or more processors operatively coupled to the memory; and instructions stored in the memory. The instructions in the memory may be operable, when executed by the one or more processors, to cause the base station to transmit, on a downlink control channel and a first beam, first DCI, wherein the first DCI includes scheduling information for a second DCI that is carried on a downlink shared channel; and transmit multiple repetitions of the second DCI on the downlink shared channel on a plurality of second beams.

In some aspects, a non-transitory computer-readable medium may store one or more instructions for wireless communication that, when executed by one or more processors of a base station, may cause the base station to receive, on a downlink control channel and a first beam, first DCI, wherein the first DCI identifies a second DCI that is carried on a downlink shared channel; and receive multiple repetitions of the second DCI on the downlink shared channel on a plurality of second beams.

In some aspects, a non-transitory computer-readable medium may store one or more instructions for wireless communication that, when executed by one or more processors of a UE, may cause the UE to transmit, on a downlink control channel and a first beam, first DCI, wherein the first DCI includes scheduling information for a second DCI that is carried on a downlink shared channel; and transmit multiple repetitions of the second DCI on the downlink shared channel on a plurality of second beams.

In some aspects, an apparatus for wireless communication may include means for receiving, on a downlink control channel and a first beam, first DCI, wherein the first DCI identifies a second DCI that is carried on a downlink shared channel; and means for receiving multiple repetitions of the second DCI on the downlink shared channel on a plurality of second beams.

In some aspects, an apparatus for wireless communication may include means for transmitting, on a downlink control channel and a first beam, first DCI, wherein the first DCI includes scheduling information for a second DCI that is carried on a downlink shared channel; and means for transmitting multiple repetitions of the second DCI on the downlink shared channel on a plurality of second beams.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
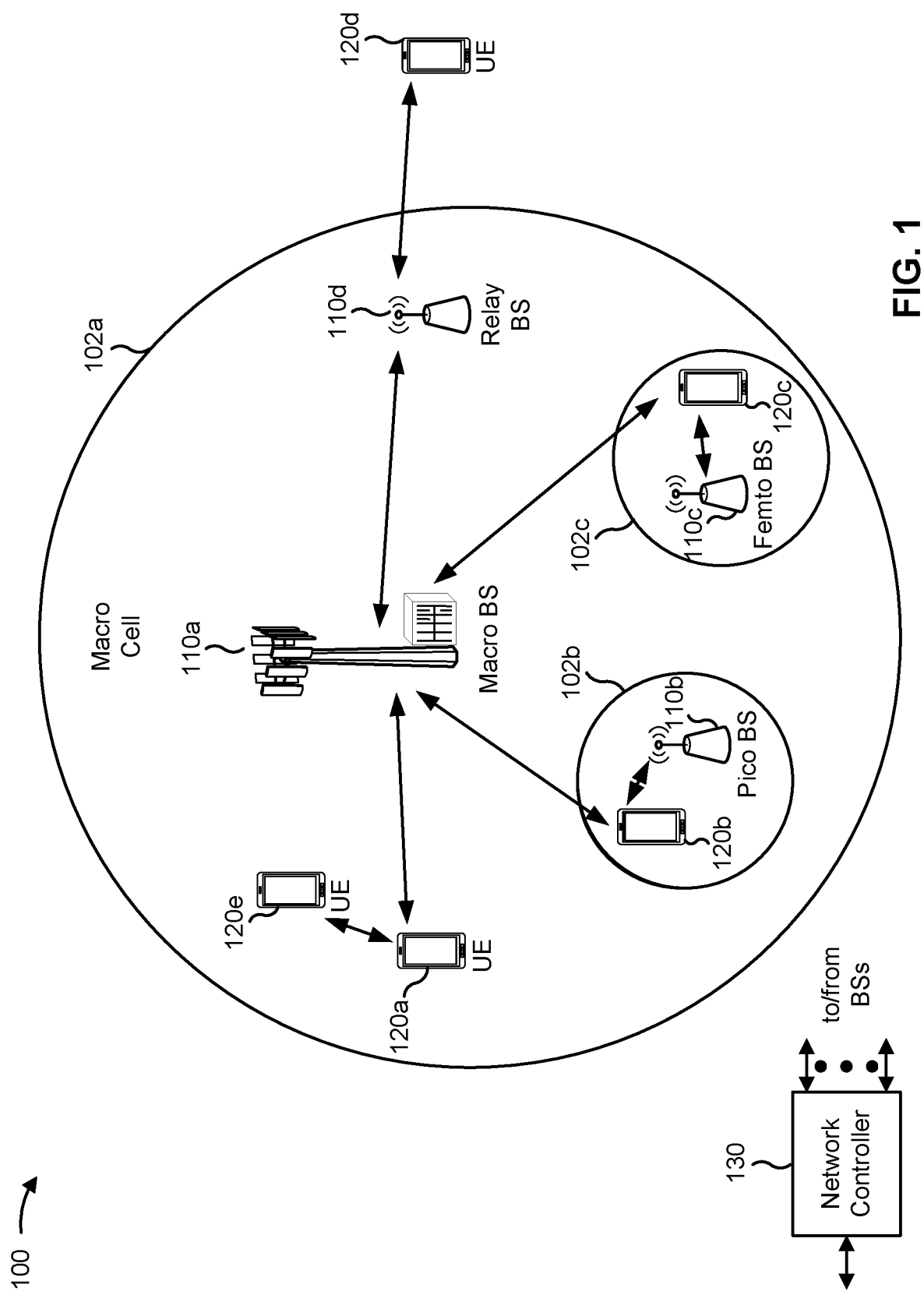
FIG. 1 is a diagram illustrating an example of a wireless network, in accordance with the present disclosure.

In some cases, a physical downlink shared channel (PDSCH) that carries downlink control information (DCI) may be transmitted on a beam, and a corresponding physical downlink control channel (PDCCH) may be transmitted on a wider beam, such as a pseudo-omnidirectional beam. A pseudo-omni-directional beam is a beam associated with a broad beam width to cover a wider coverage area than a beam typically used for data communications in a millimeter wave network, and narrower than a fully omnidirectional transmit beam. In such a case, the PDCCH may have a low beamforming gain, wider coverage, and a low modulation and coding scheme (MCS) (leading to high reliability relative to the PDSCH), whereas the PDSCH may have a high beamforming gain, narrower coverage, and a higher MCS (leading to low reliability relative to the PDCCH while providing a higher throughput). The lower reliability associated with beamformed PDSCH transmission may lead to unsuccessful decoding of piggyback DCI (described below) and/or missed piggyback DCI, which may use network resources for detection of missed DCI or failed decoding of piggyback DCI, as well as retransmission of the piggyback DCI. Some techniques and apparatuses described herein provide transmission of piggybacked DCI using multiple beams. For example, the piggyback DCI may be transmitted using PDSCH transmission a plurality of times on a corresponding plurality of transmit beams. The piggyback DCI may include scheduling information for one or more PDSCHs other than a PDSCH that carries the piggyback DCI, and/or may carry scheduling information for the PDSCH that carries the piggyback DCI. In some aspects, the piggyback DCI may include beam configurations for one or more transmit beams of the PDSCH. Thus, reliability of the piggyback DCI is improved and utilization of network resources is improved.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed. NR or 5G RAT networks may use beamforming for communication between two or more entities, which may improve beamforming gain of a communication, at the cost of narrower coverage and lower reliability relative to a wide beam transmission. Techniques and apparatuses described herein provide multi-beam transmission of DCI on a PDSCH.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using P2P communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
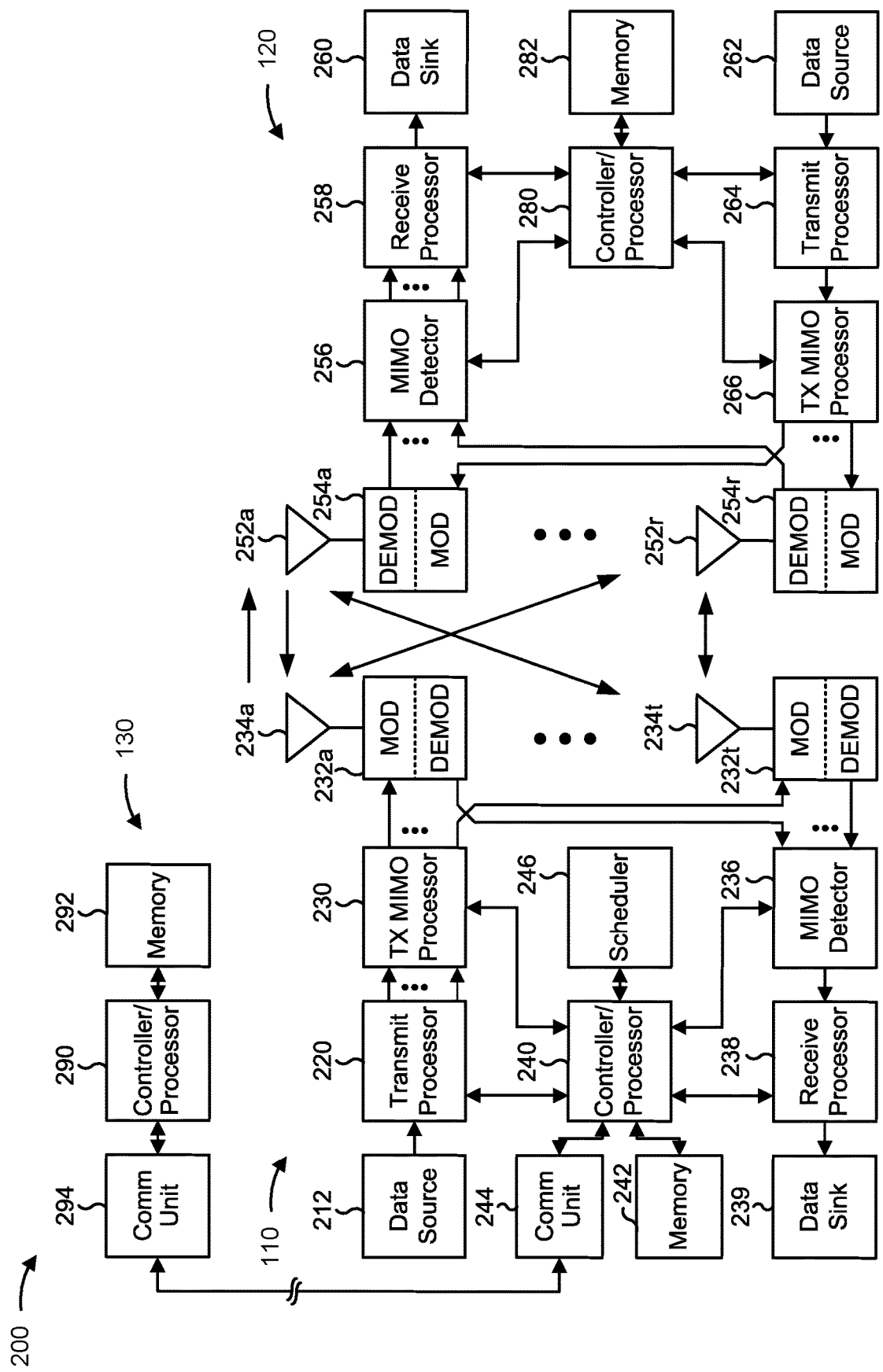
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T>1 and R>1.

At base station 110, a transmit processor 220 may receive data from a data source 212 for one or more UEs, select one or more MCS for each UE based at least in part on channel quality indicators (CQIs) received from the UE, process (e.g., encode and modulate) the data for each UE based at least in part on the MCSs selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 3-8).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 3-8).

Controller/processor 240 of base station 110, controller/processor 280 of UE 120, and/or any other component(s) of FIG. 2 may perform one or more techniques associated with, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively.

Figure 7:
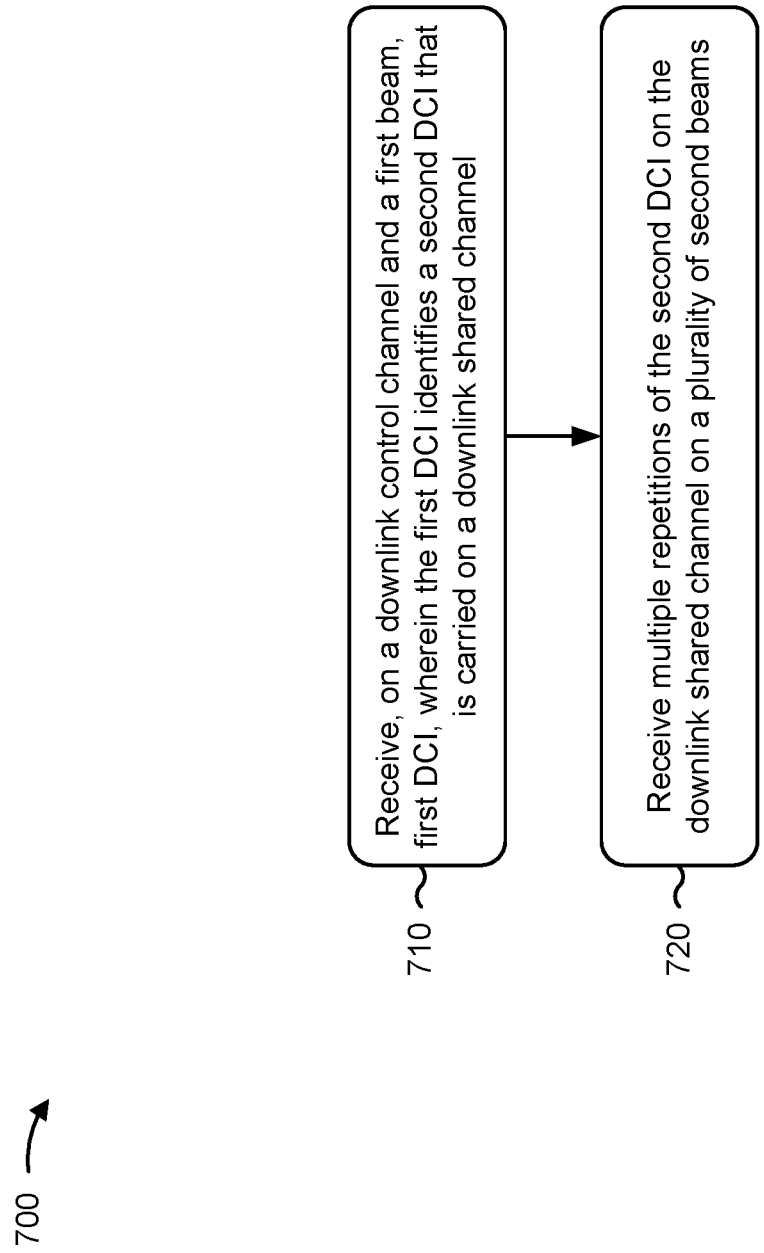
FIG. 7 is a diagram illustrating an example process performed, for example, by a user equipment, in accordance with the present disclosure.

The stored program codes, when executed by processor 280 and/or other processors and modules at UE 120, may cause the UE 120 to perform operations described with respect to process 700 of FIG. 7 and/or other processes as described herein. The stored program codes, when executed by processor 240 and/or other processors and modules at base station 110, may cause the base station 110 to perform operations described with respect to process 800 of FIG. 8 and/or other processes as described herein. A scheduler 246 may schedule UEs for data transmission on the downlink and/or uplink.

In some aspects, UE 120 may include means for receiving, on a downlink control channel and a first beam, first downlink control information (DCI), wherein the first DCI identifies a second DCI that is carried on a downlink shared channel, means for receiving multiple repetitions of the second DCI on the downlink shared channel on a plurality of second beams, and/or the like. In some aspects, such means may include one or more components of UE 120 described in connection with FIG. 2.

In some aspects, base station 110 may include means for transmitting, on a downlink control channel and a first beam, first DCI, wherein the first DCI includes scheduling information for a second DCI that is carried on a downlink shared channel, means for transmitting multiple repetitions of the second DCI on the downlink shared channel on a plurality of second beams, and/or the like. In some aspects, such means may include one or more components of base station 110 described in connection with FIG. 2.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

DCI is traditionally transmitted to a UE on a PDCCH in a control resource set (CORESET). This may involve blind decoding, because a UE is given all the information required to decode a PDCCH (e.g., the resource allocation of PDCCH, the aggregation level, and so on), and may use this information to decode according to multiple blind decoding hypotheses until a PDCCH for the UE is discovered. In some cases, DCI, or some part of a DCI, can be transmitted on a PDSCH. DCI, or part of DCI, that is transmitted on a PDSCH is referred to as a piggyback or piggybacked DCI. Information used to decode the piggyback DCI, such as a resource allocation for the piggyback DCI, may be known to the UE based at least in part on another DCI, which may be provided prior to the piggyback DCI. Thus, blind decoding is not required for the piggyback DCI, a higher MCS level can be used for the piggyback DCI, and a larger payload and/or more DCI can be sent in a given set of resources.

In some cases, a PDSCH may be transmitted on a beam. For example, a PDSCH may be transmitted using a narrower beam than a PDCCH. Thus, the PDCCH may have a low beamforming gain, wider coverage, and a low MCS (leading to high reliability), whereas the PDSCH may have a high beamforming gain, narrower coverage, and a higher MCS (leading to low reliability). The lower reliability associated with beamformed PDSCH transmission may lead to unsuccessful decoding of piggyback DCI and/or missed piggyback DCI, which may use network resources for retransmission of the piggyback DCI.

Some techniques and apparatuses described herein provide transmission of piggyback DCI using multiple beams. For example, the piggyback DCI may be transmitted using PDSCH transmission a plurality of times on a corresponding plurality of transmit beams. The piggyback DCI may include scheduling information for one or more PDSCHs other than a PDSCH that carries the piggyback DCI, and/or may carry scheduling information for the PDSCH that carries the piggyback DCI. In some aspects, the piggyback DCI may include beam configurations for one or more transmit beams of the PDSCH. Thus, reliability of the piggyback DCI is improved and utilization of network resources is improved.

Figure 3:
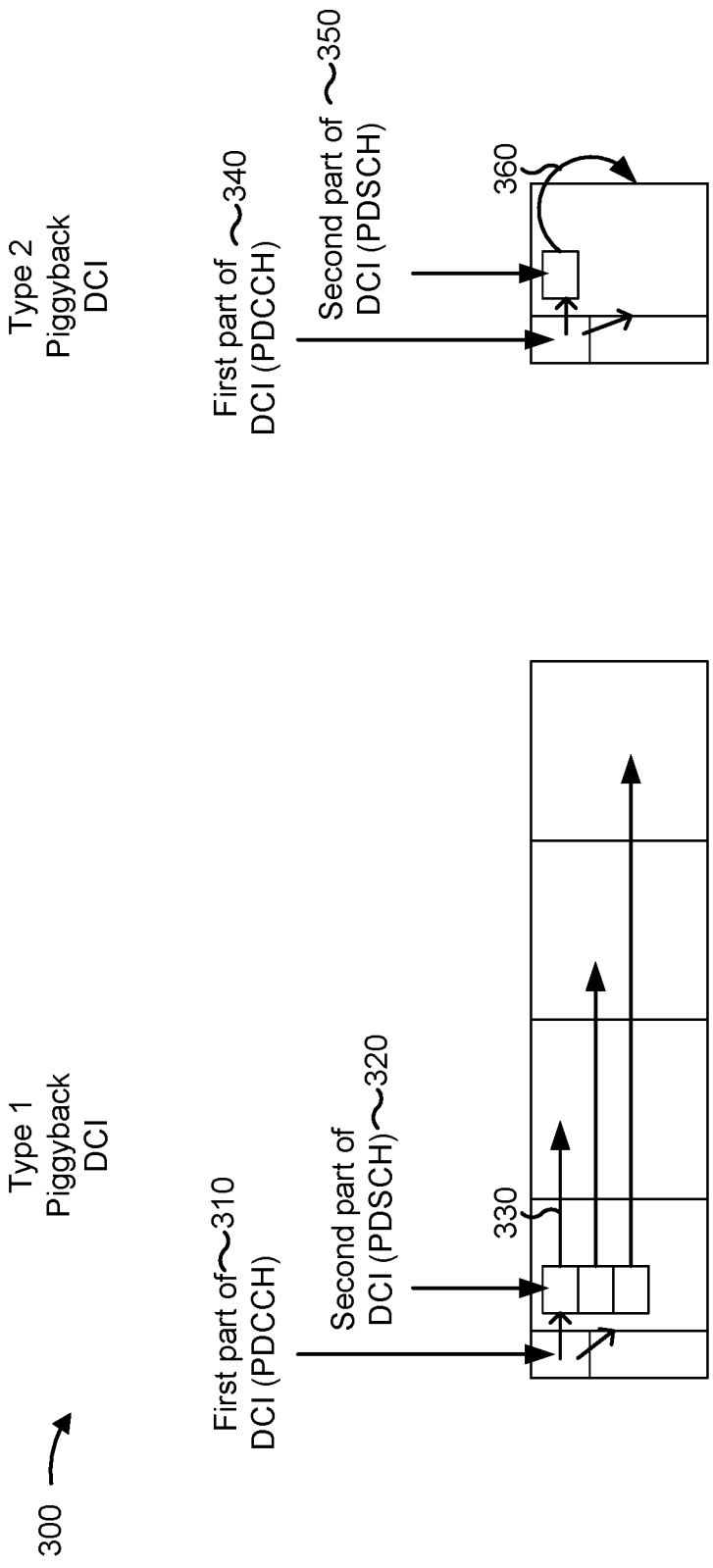
FIG. 3 is a diagram illustrating an example of piggyback DCI types, in accordance with the present disclosure.

FIG. 3 is a diagram illustrating an example 300 of piggyback DCI types, in accordance with the present disclosure. As shown, example 300 shows a Type 1 and a Type 2 piggyback DCI. In Type 1, a first part of DCI (e.g., a first DCI message), shown by reference number 310, is provided on a PDCCH. The first part of the DCI may include information for decoding a PDSCH that is to carry one or more piggyback DCI. For example, in Type 1, the first part of the DCI may include all the scheduling information for a PDSCH (as indicated by the arrow from the first part of the DCI to the PDSCH) and all the scheduling information for the second part of the DCI in the PDSCH (as indicated by the arrow from the first part of the DCI to the second part of the DCI). The second part of the DCI may include all the scheduling information the for subsequent PDSCH. Here, the one or more piggyback DCI are shown by reference number 320 and are referred to as a second part of the DCI. For example, the one or more piggyback DCI may include respective DCI that carry information for decoding subsequent PDSCHs (e.g., scheduling information and/or the like), shown by reference number 330. Generally, an arrow from DCI to a corresponding PDSCH indicates that the DCI carries scheduling information for the PDSCH.

In Type 2, a first part of DCI, shown by reference number 340, is provided on a PDCCH. The first part of the DCI may identify a second part of the DCI, shown by reference number 350. The first part of the DCI and the second part of the DCI may collectively carry information for decoding the PDSCH, as shown by reference number 360. In Type 2, the first part of the DCI may include a part of scheduling information for a PDSCH (shown by the arrow from the first part of the DCI to the PDSCH) and all the scheduling information for the second part of the DCI in the PDSCH (shown by the arrow from the first part of the DCI to the second part of the DCI). The second part of the DCI may include a part of scheduling information for the PDSCH, shown by the arrow from the second part of the DCI to the PDSCH. In some aspects, the PDSCH, and thus the second part of the DCI, may be transmitted using beamforming, leading to lower reliability than pseudo-omnidirectional transmission of the PDSCH. Some techniques and apparatuses described herein provide multi-beam transmission of the second part of the DCI, as described in more detail in connection with FIGS. 4-6.

As indicated above, FIG. 3 is provided as an example. Other examples may differ from what is described with respect to FIG. 3.

Figure 4:
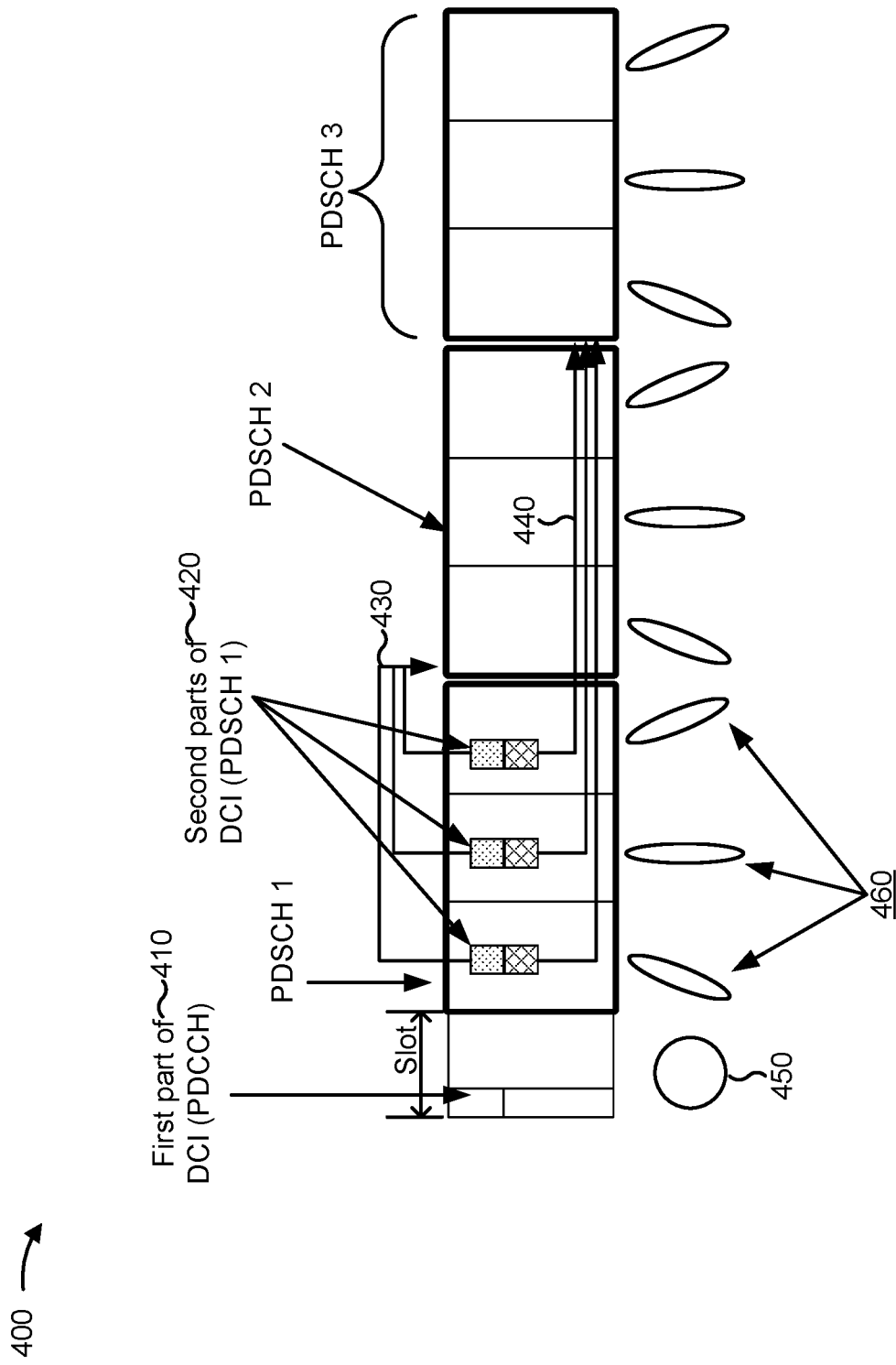
FIGS. 4-6 are diagrams illustrating examples of multi-beam transmission of piggyback DCI, in accordance with the present disclosure.

FIG. 4 is a diagram illustrating an example 400 of multi-beam transmission of piggyback DCI, in accordance with the present disclosure. Example 400, example 500 of FIG. 5, and example 600 of FIG. 6 show communications by a base station such as BS 110. Three PDSCHs are shown in FIG. 4: PDSCH 1, PDSCH 2, and PDSCH 3. PDSCHs are indicated by a thick border. Each of the three PDSCHs is shown as including three slots (though a PDSCH can include any number of slots). A first part of DCI is shown by reference number 410. The first part of the DCI may include scheduling information for second parts of the DCI, which are shown by reference number 420. Arrows from the first part of the DCI to the second parts of the DCI (which are used elsewhere herein to indicate that the first part of the DCI schedules the second part of the DCI) are omitted here for clarity of the drawing. As shown, the second part of the DCI is repeated a total of three times in different slots of PDSCH 1, which may be referred to as inter-slot repetition. As further shown, the second part of the DCI may include scheduling information for a PDSCH 2 (shown by reference number 430) and a PDSCH 3 (shown by reference number 440). For example, the same data (e.g., the same DCI) may be repeated three times across slots.

As shown by reference number 450, the PDCCH may be transmitted using a wide beam (indicated by a circle), and as shown by reference number 460, the second part of the DCI may be transmitted using respective beams (indicated by ovals). For example, the three repetitions of the second part of the DCI may be transmitted using three different beams, as indicated by the beams of example 400 being pointed in different directions. Furthermore, the second part of the DCI may include beam configurations for three beams for transmission of the corresponding PDSCH. For example, the DCI that schedules PDSCH 2 may carry three beam configurations for the three beams used to transmit PDSCH 2. In some aspects, the beam configuration may include a transmission configuration indicator (TCI) state, quasi-colocation information, a beam identifier, a synchronization signal block index, a channel state information reference signal identifier, or the like. By transmitting the repetitions of the piggyback DCI via the different beams, reliability of the piggyback DCI is improved while realizing the improved propagation properties and data rate achievable using beamformed communication.

As indicated above, FIG. 4 is provided as an example. Other examples may differ from what is described with respect to FIG. 4.

Figure 5:
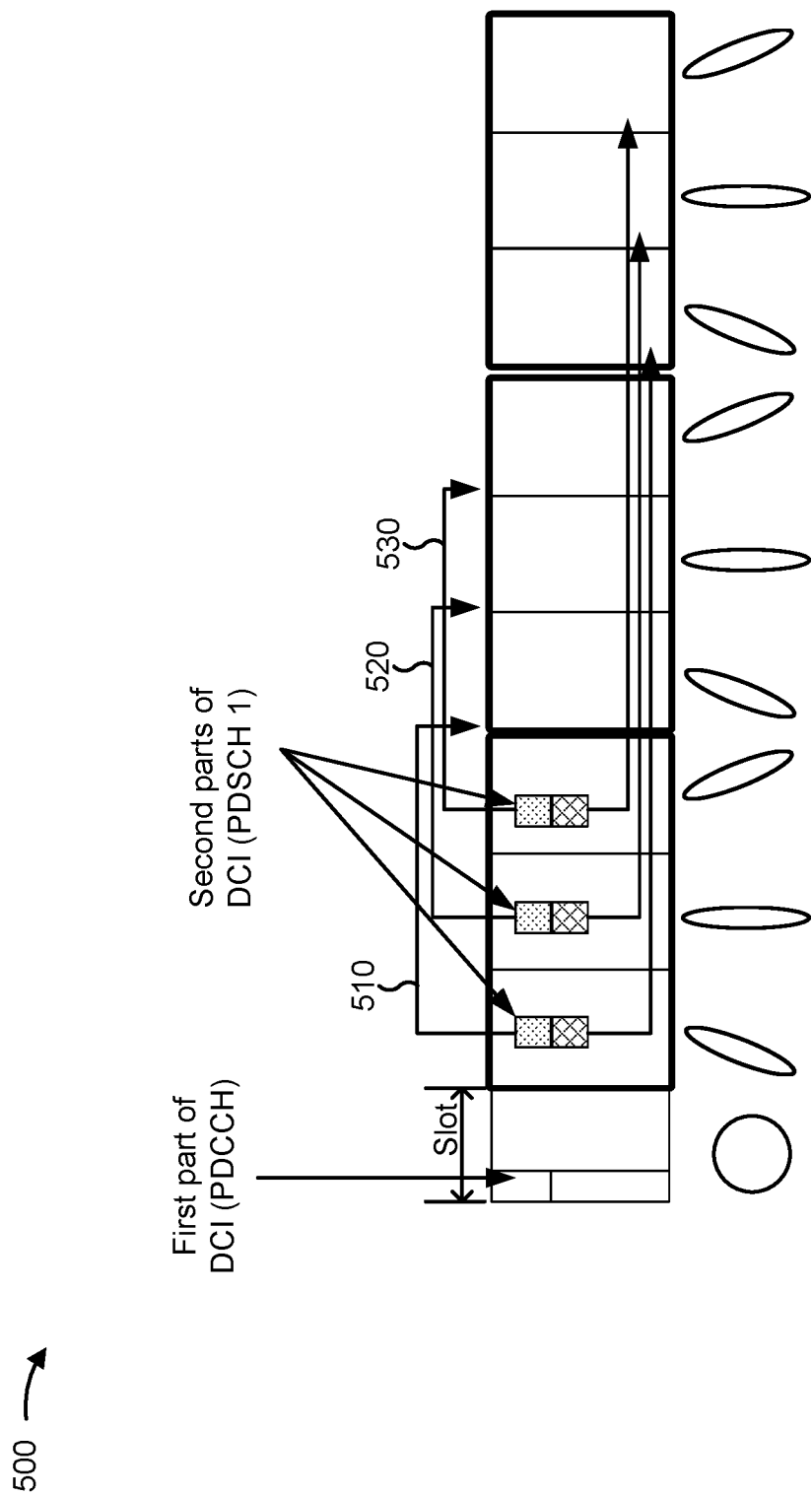
Figure 6:
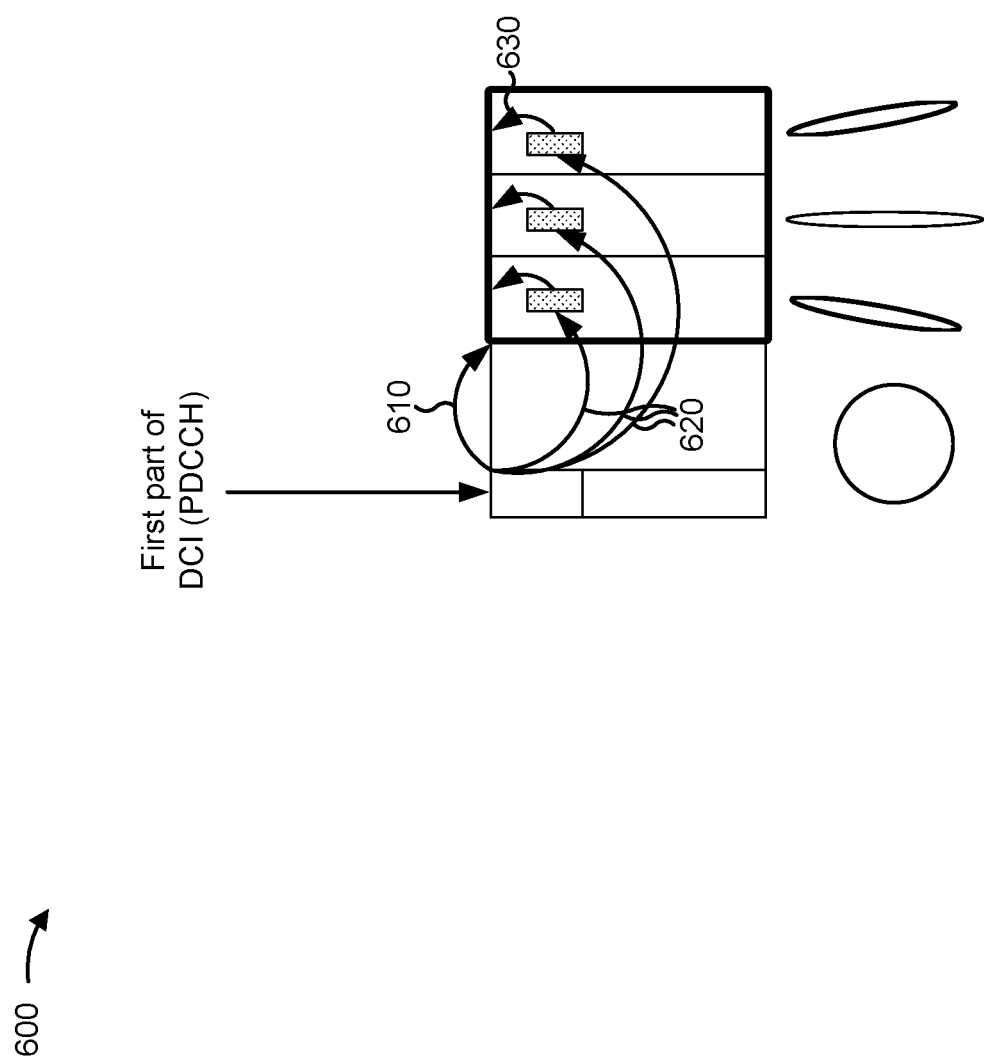

FIG. 5 is a diagram illustrating an example 500 of multi-beam transmission of piggyback DCI, in accordance with the present disclosure. Example 500 shows communications by a base station such as BS 110. As in example 400, a first part of the DCI, transmitted via a PDCCH, schedules second parts of the DCI in PDSCH 1. In example 500, each repetition of the DCI carries a beam configuration for a corresponding part of a PDSCH. For example, the three repetitions of the second part of the DCI that schedule PDSCH 2 may each carry a respective beam configuration for a different part of PDSCH 2, as indicated by the arrows from the repetitions of the second part of the DCI to the corresponding parts of PDSCH 2 shown by reference numbers 510, 520, and 530. In some aspects, scheduling information of the second part of the DCI, other than the beam configurations, may be repeated in each repetition of the second part of the DCI. As mentioned above, a beam configuration may include a TCI state, quasi-colocation information, a beam identifier, a synchronization signal block index, a channel state information reference signal identifier, or the like. By transmitting the repetitions of the piggyback DCI via the different beams, reliability of the piggyback DCI is improved while realizing the improved propagation properties and data rate achievable using beamformed communication.

As indicated above, FIG. 5 is provided as an example. Other examples may differ from what is described with respect to FIG. 5.

FIG. 6 is a diagram illustrating an example 600 of multi-beam transmission of piggyback DCI, in accordance with the present disclosure. Example 600 is an example of intra-slot repetition for a Type 2 piggyback DCI. Example 600 shows a first part of DCI transmitted via a PDCCH. In example 600, the first part of the DCI includes scheduling information for the PDSCH (indicated by the arrow shown by reference number 610) and for the second part of the DCI (indicated by the arrows shown by reference number 620). As shown by the arrow shown by reference number 630, the second part of the DCI may carry scheduling information for the PDSCH. For example, each repetition of the second part of the DCI may carry a beam configuration for a corresponding part of the PDSCH, and each repetition of the second part may carry scheduling information for the PDSCH. As further shown, three repetitions of the DCI (and three parts of the PDSCH) may be transmitted using different beams.

In some aspects, piggyback DCIs on a PDSCH may be transmitted via multiple beams by using PDSCH repetition. For example, the same data and piggyback DCIs may be transmitted N times by using N different transmit beams. In some aspects, the repetition is performed within a slot. In some aspects, the repetition is performed across slots. In some aspects, the piggyback DCIs can include the scheduling information of other PDSCHs (e.g., Type 1 piggyback DCI) or the PDSCH on which the piggyback DCIs are transmitted (e.g., Type 2 piggyback DCI). In some aspects, the piggyback DCI(s) includes the scheduling information of another PDSCH (e.g., a Type 1 piggyback DCI). In some aspects, the piggyback DCI(s) includes the scheduling information of the PDSCH on which the DCIs are transmitted (e.g., Type-2 piggyback DCI). In some aspects, the piggyback DCIs can include transmit beam information of the PDSCH (e.g., TCI). In some aspects, each piggyback DCI includes one TCI for one PDSCH (or a part of the PDSCH). In some aspects, each piggyback DCI includes multiple TCIs for one PDSCH (or multiple parts of the PDSCH).

As indicated above, FIG. 6 is provided as an example. Other examples may differ from what is described with respect to FIG. 6.

FIG. 7 is a diagram illustrating an example process 700 performed, for example, by a UE, in accordance with the present disclosure. Example process 700 is an example where the UE (e.g., UE 120 and/or the like) performs operations associated with receiving multi-beam piggyback DCI.

As shown in FIG. 7, in some aspects, process 700 may include receiving, on a downlink control channel and a first beam, first DCI, wherein the first DCI identifies a second DCI that is carried on a downlink shared channel (block 710). For example, the UE (e.g., using antenna 252, DEMOD 254, MIMO detector 256, receive processor 258, controller/processor 280, and/or the like) may receive, on a downlink control channel and a first beam, first DCI, as described above. In some aspects, the first DCI identifies a second DCI that is carried on a downlink shared channel. In some aspects, the first DCI is referred to herein as a first part of DCI.

As further shown in FIG. 7, in some aspects, process 700 may include receiving multiple repetitions of the second DCI on the downlink shared channel on a plurality of second beams (block 720). For example, the UE (e.g., using antenna 252, DEMOD 254, MIMO detector 256, receive processor 258, controller/processor 280, and/or the like) may receive multiple repetitions of the second DCI on the downlink shared channel on a plurality of second beams, as described above. In some aspects, the second DCI is referred to herein as a second part of the DCI.

Process 700 may include additional aspects, such as any single aspect or any combination of aspects described below and/or in connection with one or more other processes described elsewhere herein.

In a first aspect, the multiple repetitions are received within a single slot.

In a second aspect, alone or in combination with the first aspect, the multiple repetitions are received in two or more different slots.

In a third aspect, alone or in combination with one or more of the first and second aspects, the second DCI includes scheduling information for one or more shared channels subsequent to the downlink shared channel, and wherein the process 700 further comprises decoding the one or more shared channels.

In a fourth aspect, alone or in combination with one or more of the first through third aspects, the second DCI includes scheduling information for the downlink shared channel, and the process 700 further comprises decoding the downlink shared channel.

In a fifth aspect, alone or in combination with one or more of the first through fourth aspects, the multiple repetitions of the second DCI indicate respective beam configurations for a shared channel or one or more parts of the shared channel, and the process 700 further comprises receiving the shared channel or the one or more parts of the shared channel using the respective beam configurations.

In a sixth aspect, alone or in combination with one or more of the first through fifth aspects, the respective beam configurations comprise respective transmission configuration indicator states.

In a seventh aspect, alone or in combination with one or more of the first through sixth aspects, two or more repetitions, of the multiple repetitions of the second DCI, carry a same set of beam configurations for a shared channel or two or more parts of the shared channel.

In an eighth aspect, alone or in combination with one or more of the first through seventh aspects, the set of beam configurations comprise respective transmission configuration indicator states.

In a ninth aspect, alone or in combination with one or more of the first through eighth aspects, each repetition of the multiple repetitions of the second DCI carries multiple transmission configuration indicator states for a shared channel or a part of the shared channel.

In a tenth aspect, alone or in combination with one or more of the first through ninth aspects, the plurality of second beams are different from each other with regard to at least one beam parameter (e.g., a spatial parameter, such as a transmission direction, a quasi-colocation parameter, and/or the like).

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
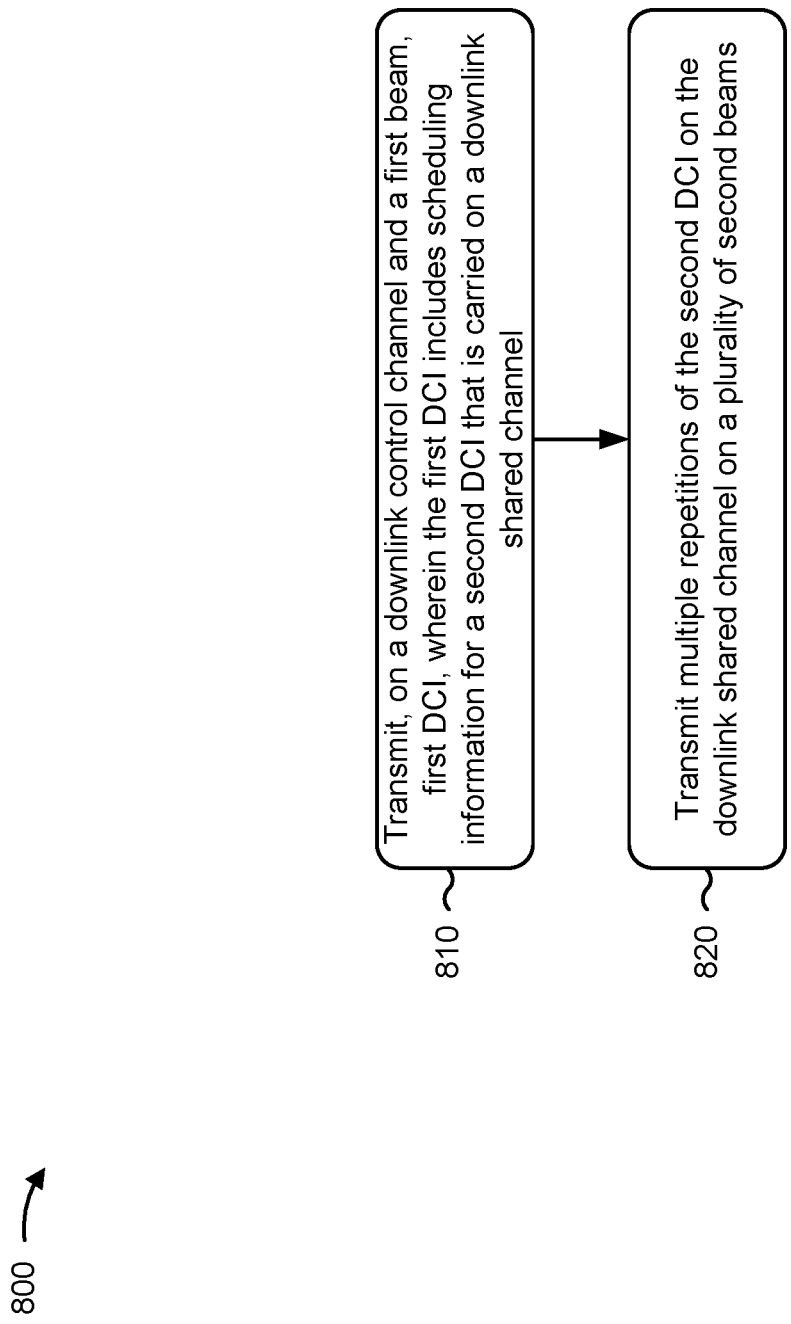
FIG. 8 is a diagram illustrating an example process performed, for example, by a base station, in accordance with the present disclosure.

FIG. 8 is a diagram illustrating an example process 800 performed, for example, by a base station, in accordance with the present disclosure. Example process 800 is an example where the base station (e.g., BS 110 and/or the like) performs operations associated with multi-beam piggyback DCI.

As shown in FIG. 8, in some aspects, process 800 may include transmitting, on a downlink control channel and a first beam, first DCI, wherein the first DCI includes scheduling information for a second DCI that is carried on a downlink shared channel (block 810). For example, the base station (e.g., using controller/processor 240, transmit processor 220, TX MIMO processor 230, MOD 232, antenna 234, and/or the like) may transmit, on a downlink control channel and a first beam, first DCI, as described above. In some aspects, the first DCI includes scheduling information for a second DCI that is carried on a downlink shared channel.

As further shown in FIG. 8, in some aspects, process 800 may include transmitting multiple repetitions of the second DCI on the downlink shared channel on a plurality of second beams (block 820). For example, the base station (e.g., using controller/processor 240, transmit processor 220, TX MIMO processor 230, MOD 232, antenna 234, and/or the like) may transmit multiple repetitions of the second DCI on the downlink shared channel on a plurality of second beams, as described above.

Process 800 may include additional aspects, such as any single aspect or any combination of aspects described below and/or in connection with one or more other processes described elsewhere herein.

In a first aspect, the multiple repetitions are transmitted within a single slot.

In a second aspect, alone or in combination with the first aspect, the multiple repetitions are transmitted in two or more different slots.

In a third aspect, alone or in combination with one or more of the first and second aspects, the second DCI includes scheduling information for one or more shared channels subsequent to the downlink shared channel, and the process 700 further comprises transmitting the one or more shared channels.

In a fourth aspect, alone or in combination with one or more of the first through third aspects, the second DCI includes scheduling information for the downlink shared channel, and the process 700 further comprises transmitting the downlink shared channel.

In a fifth aspect, alone or in combination with one or more of the first through fourth aspects, the multiple repetitions of the second DCI indicate respective beam configurations for a shared channel or one or more parts of the shared channel, and the process 700 further comprises transmitting the shared channel or the one or more parts of the shared channel using the respective beam configurations.

In a sixth aspect, alone or in combination with one or more of the first through fifth aspects, the respective beam configurations comprise respective transmission configuration indicator states.

In a seventh aspect, alone or in combination with one or more of the first through sixth aspects, two or more repetitions, of the multiple repetitions of the second DCI, carry a same set of beam configurations for a shared channel or two or more parts of the shared channel.

In an eighth aspect, alone or in combination with one or more of the first through seventh aspects, the set of beam configurations comprises respective transmission configuration indicator states.

In a ninth aspect, alone or in combination with one or more of the first through eighth aspects, each repetition of the multiple repetitions of the second DCI carries multiple transmission configuration indicator states for a shared channel or a part of the shared channel.

In a tenth aspect, alone or in combination with one or more of the first through ninth aspects, the plurality of second beams are different from each other with regard to at least one beam parameter.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The following provides an overview of some Aspects of the present disclosure:

Aspect 1: A method of wireless communication performed by a user equipment (UE), comprising: receiving, on a downlink control channel and a first beam, first downlink control information (DCI), wherein the first DCI identifies a second DCI that is carried on a downlink shared channel; and receiving multiple repetitions of the second DCI on the downlink shared channel on a plurality of second beams.

Aspect 2: The method of Aspect 1, wherein the multiple repetitions are received within a single slot.

Aspect 3: The method of Aspect 1, wherein the multiple repetitions are received in two or more different slots.

Aspect 4: The method of any of Aspects 1-3, wherein the second DCI includes scheduling information for one or more shared channels subsequent to the downlink shared channel, and wherein the method further comprises decoding the one or more shared channels.

Aspect 5: The method of any of Aspects 1-4, wherein the second DCI includes scheduling information for the downlink shared channel, and wherein the method further comprises decoding the downlink shared channel.

Aspect 6: The method of any of Aspects 1-5, wherein the multiple repetitions of the second DCI indicate respective beam configurations for a shared channel or one or more parts of the shared channel, and wherein the method further comprises receiving the shared channel or the one or more parts of the shared channel using the respective beam configurations.

Aspect 7: The method of Aspect 6, wherein the respective beam configurations comprise respective transmission configuration indicator states.

Aspect 8: The method of any of Aspects 1-7, wherein two or more repetitions, of the multiple repetitions of the second DCI, carry a same set of beam configurations for a shared channel or two or more parts of the shared channel.

Aspect 9: The method of Aspect 8, wherein the set of beam configurations comprise respective transmission configuration indicator states.

Aspect 10: The method of any of Aspects 1-9, wherein each repetition of the multiple repetitions of the second DCI carries multiple transmission configuration indicator states for a shared channel or a part of the shared channel.

Aspect 11: The method of any of Aspects 1-10, wherein the plurality of second beams are different from each other with regard to at least one beam parameter.

Aspect 12: A method of wireless communication performed by a base station, comprising: transmitting, on a downlink control channel and a first beam, first downlink control information (DCI), wherein the first DCI includes scheduling information for a second DCI that is carried on a downlink shared channel; and transmitting multiple repetitions of the second DCI on the downlink shared channel on a plurality of second beams.

Aspect 13: The method of Aspect 12, wherein the multiple repetitions are transmitted within a single slot.

Aspect 14: The method of Aspect 12, wherein the multiple repetitions are transmitted in two or more different slots.

Aspect 15: The method of any of Aspects 12-14, wherein the second DCI includes scheduling information for one or more shared channels subsequent to the downlink shared channel, and wherein the method further comprises transmitting the one or more shared channels.

Aspect 16: The method of any of Aspects 12-15, wherein the second DCI includes scheduling information for the downlink shared channel, and wherein the method further comprises transmitting the downlink shared channel.

Aspect 17: The method of any of Aspects 12-16, wherein the multiple repetitions of the second DCI indicate respective beam configurations for a shared channel or one or more parts of the shared channel, and wherein the method further comprises transmitting the shared channel or the one or more parts of the shared channel using the respective beam configurations.

Aspect 18: The method of Aspect 17, wherein the respective beam configurations comprise respective transmission configuration indicator states.

Aspect 19: The method of any of Aspects 12-18, wherein two or more repetitions, of the multiple repetitions of the second DCI, carry a same set of beam configurations for a shared channel or two or more parts of the shared channel.

Aspect 20: The method of Aspect 19, wherein the set of beam configurations comprises respective transmission configuration indicator states.

Aspect 21: The method of any of Aspects 12-20, wherein each repetition of the multiple repetitions of the second DCI carries multiple transmission configuration indicator states for a shared channel or a part of the shared channel.

Aspect 22: The method of any of Aspects 12-21, wherein the plurality of second beams are different from each other with regard to at least one beam parameter.

Aspect 30: The method of Aspect 28, wherein the multiple repetitions are in two or more different slots.

Aspect 31: An apparatus for wireless communication at a device, comprising a processor; memory coupled with the processor; and instructions stored in the memory and executable by the processor to cause the apparatus to perform the method of one or more Aspects of Aspects 1-30.

Aspect 32: A device for wireless communication, comprising a memory and one or more processors coupled to the memory, the memory and the one or more processors configured to perform the method of one or more Aspects of Aspects 1-30.

Aspect 33: An apparatus for wireless communication, comprising at least one means for performing the method of one or more Aspects of Aspects 1-30.

Aspect 34: A non-transitory computer-readable medium storing code for wireless communication, the code comprising instructions executable by a processor to perform the method of one or more Aspects of Aspects 1-30.

Aspect 35: A non-transitory computer-readable medium storing a set of instructions for wireless communication, the set of instructions comprising one or more instructions that, when executed by one or more processors of a device, cause the device to perform the method of one or more Aspects of Aspects 1-30.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
    receiving, on a downlink control channel and a first beam, first downlink control information (DCI), wherein the first DCI identifies a second DCI that is carried on a downlink shared channel; and
    receiving multiple repetitions of the second DCI on the downlink shared channel on a plurality of second beams,
        wherein two or more repetitions, of the multiple repetitions of the second DCI, carry a same set of beam configurations for a shared channel or two or more parts of the shared channel.

2. The method of claim 1, wherein the multiple repetitions are received within a single slot.

3. The method of claim 1, wherein the multiple repetitions are received in two or more different slots.

4. The method of claim 1, wherein the second DCI includes scheduling information for one or more shared channels subsequent to the downlink shared channel, and wherein the method further comprises decoding the one or more shared channels.

5. The method of claim 1, wherein the second DCI includes scheduling information for the downlink shared channel, and wherein the method further comprises decoding the downlink shared channel.

6. The method of claim 1, wherein at least one repetition, of the multiple repetitions of the second DCI, indicate respective beam configurations for one or more parts of the shared channel, and wherein the method further comprises transmitting the shared channel or the one or more parts of the shared channel using the respective beam configurations.

7. The method of claim 6, wherein the respective beam configurations comprise respective transmission configuration indicator states.

8. The method of claim 1, wherein the set of beam configurations comprise respective transmission configuration indicator states.

9. The method of claim 1, wherein at least one repetition of the multiple repetitions of the second DCI carries multiple transmission configuration indicator states for a part of the shared channel.

10. The method of claim 1, wherein the plurality of second beams are different from each other with regard to at least one beam parameter.

11. A method of wireless communication performed by a base station, comprising:
    transmitting, on a downlink control channel and a first beam, first downlink control information (DCI), wherein the first DCI includes scheduling information for a second DCI that is carried on a downlink shared channel; and
    transmitting multiple repetitions of the second DCI on the downlink shared channel on a plurality of second beams,
        wherein two or more repetitions, of the multiple repetitions of the second DCI, carry a same set of beam configurations for a shared channel or two or more parts of the shared channel.

12. The method of claim 11, wherein the multiple repetitions are transmitted within a single slot.

13. The method of claim 11, wherein the multiple repetitions are transmitted in two or more different slots.

14. The method of claim 11, wherein the second DCI includes scheduling information for one or more shared channels subsequent to the downlink shared channel, and wherein the method further comprises transmitting the one or more shared channels.

15. The method of claim 11, wherein the second DCI includes scheduling information for the downlink shared channel, and wherein the method further comprises transmitting the downlink shared channel.

16. The method of claim 11, wherein at least one repetition, of the multiple repetitions of the second DCI, indicate respective beam configurations for one or more parts of the shared channel, and wherein the method further comprises transmitting the shared channel or the one or more parts of the shared channel using the respective beam configurations.

17. The method of claim 16, wherein the respective beam configurations comprise respective transmission configuration indicator states.

18. The method of claim 11, wherein the set of beam configurations comprises respective transmission configuration indicator states.

19. The method of claim 11, wherein at least one repetition of the multiple repetitions of the second DCI carries multiple transmission configuration indicator states for a part of the shared channel.

20. The method of claim 11, wherein the plurality of second beams are different from each other with regard to at least one beam parameter.

21. A user equipment (UE) for wireless communication, comprising:
    memory; and
    one or more processors coupled to the memory; and
    instructions stored in the memory and operable, when executed by the one or more processors, to cause the UE to:
        receive, on a downlink control channel and a first beam, first downlink control information (DCI), wherein the first DCI identifies a second DCI that is carried on a downlink shared channel; and
        receive multiple repetitions of the second DCI on the downlink shared channel on a plurality of second beams,
            wherein each repetition of the multiple repetitions of the second DCI carries multiple transmission configuration indicator states for a shared channel or a part of the shared channel.

22. The UE of claim 21, wherein the multiple repetitions are within a single slot.

23. The UE of claim 21, wherein the multiple repetitions are in two or more different slots.

24. The UE of claim 21, wherein the second DCI includes scheduling information for one or more shared channels subsequent to the downlink shared channel, and wherein the one or more processors are configured to decode the one or more shared channels.

25. The UE of claim 21, wherein the second DCI includes scheduling information for the downlink shared channel, and wherein the one or more processors are configured to decode the downlink shared channel.

26. A base station for wireless communication, comprising:

memory; and one or more processors coupled to the memory; and instructions stored in the memory and operable, when executed by the one or more processors, to cause the base station to:

transmit, on a downlink control channel and a first beam, first downlink control information (DCI), wherein the first DCI includes scheduling information for a second DCI that is carried on a downlink shared channel; and transmit multiple repetitions of the second DCI on the downlink shared channel on a plurality of second beams, wherein each repetition of the multiple repetitions of the second DCI carries multiple transmission configuration indicator states for a shared channel or a part of the shared channel.

27. The base station of claim 26, wherein the multiple repetitions are within a single slot.

28. The base station of claim 26, wherein the multiple repetitions are in two or more different slots.

29. The base station of claim 26, wherein the second DCI includes scheduling information for one or more shared channels subsequent to the downlink shared channel, and wherein the one or more processors are configured to decode the one or more shared channels.

30. The base station of claim 26, wherein the second DCI includes scheduling information for the downlink shared channel, and wherein the one or more processors are configured to decode the downlink shared channel.

* * * * *